Nov. 28, 1967    S. L. CHILDERS ET AL    3,355,576
APPARATUS FOR AUTOMATIC SALES TOTALIZATION
Filed Nov. 19, 1962    6 Sheets-Sheet 1

INVENTORS.
Spencer L. Childers
BY Jerry W. Howard
Wilburn O. Clark

Hovey Schmidt, Johnson & Hovey.
ATTORNEYS.

Nov. 28, 1967  S. L. CHILDERS ET AL  3,355,576
APPARATUS FOR AUTOMATIC SALES TOTALIZATION
Filed Nov. 19, 1962  6 Sheets-Sheet 4

INVENTORS.
Spencer L. Childers
Jerry W. Howard
Wilburn O. Clark
BY
Hovey, Schmidt, Johnson & Hovey.
ATTORNEYS.

United States Patent Office 3,355,576
Patented Nov. 28, 1967

3,355,576
APPARATUS FOR AUTOMATIC SALES TOTALIZATION
Spencer L. Childers and Jerry W. Howard, Kansas City, Mo., and Wilburn O. Clark, Lawrence, Kans., assignors to The Vendo Company, Kansas City, Mo., a corporation of Missouri
Filed Nov. 19, 1962, Ser. No. 238,650
9 Claims. (Cl. 235—61.7)

This invention relates to credit vending systems and, more specifically, to apparatus in combination with vending machines for automatically totalizing the sales from said machines and charging the account of the customer with the price of the vended merchandise.

Coin-operated vending machines have been utilized for some time to vend a variety of merchandise. In recent years the vending machine industry has extended its operations to cover markets heretofore serviced only by retail stores and restaurants. However, these operations are still primarily dependent upon cash sales and usually require that the prospective customer have in his possession an assortment of coins in varying denominations. This necessity for cash sales is a primary limitation on such marketing operations utilizing vending machines. Credit sales have become progressively common throughout the years with the introduction of credit cards and the encouragement by retail outlets to purchase on credit. This has become widely accepted by the consumer largely due to the convenience associated with credit purchasing as against cash sales. Therefore, the growth and development of the vending machine industry has been inhibited in this respect.

It is, therefore, the primary object of this invention to provide a credit vending system for vending machines.

It is another object of this invention to provide such a system whereby the sales from vending machines are automatically totalized and charged to the account of the purchaser.

It is still another object of this invention to provide such a system wherein each customer is provided with a customer-identifying device or token, such as a credit card, for use with the vending mechanism of vending machines to enable the automatic sales totalization apparatus to distinguish the sales to one customer from the sales to another.

It is still another object of this invention to provide such a system that may be maintained and operated by a minimum of personnel in the area where the vending machines are located for customer use.

It is yet another object of this invention to provide an electronic, automatic sales totalizing apparatus capable of servicing a plurality of vending machines containing a wide variety of merchandise of varying prices.

It is yet another object of this invention to provide such electronic apparatus with a scanning device for sequentially applying an electrical signal to the vending machines to thereby enable the apparatus to service a large number of machines with such speed as to provide no noticeable discontinuity of service.

Other objects will become apparent as the detailed description proceeds.

The invention in general

Figure 1:
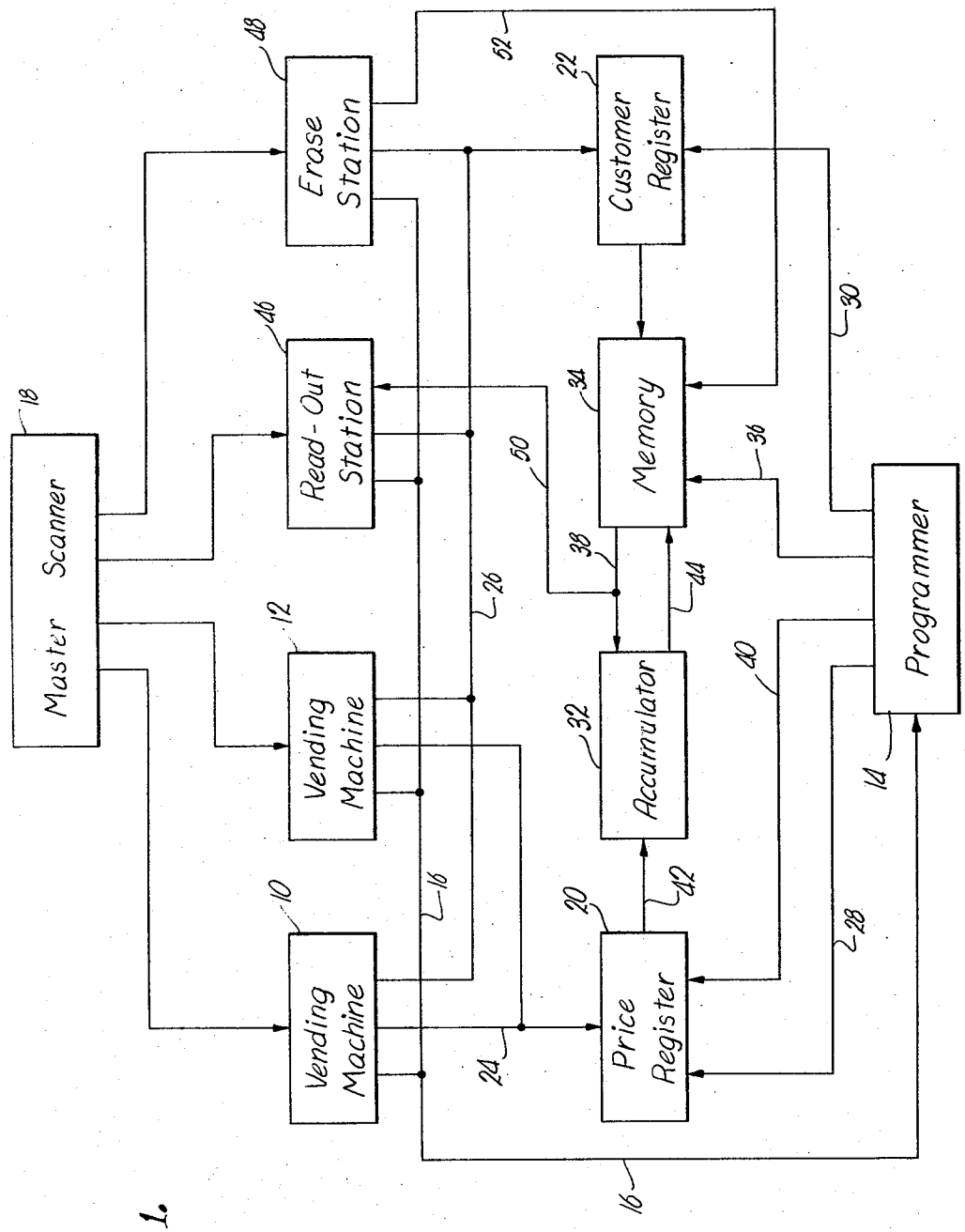
FIGURE 1 is a block diagram showing the system operation of the present invention.

The block diagram of FIGURE 1 illustrates the system concept of the present invention. The details concerning the apparatus within the blocks there shown will be discussed fully later in the specification. FIGURE 1 shows two vending machines 10 and 12 which have apparatus therein for interconnecting the vending machines with the remaining portions of the system so that the account of the purchaser of items contained by the vending machines may be charged when a purchase is made. It should be understood at the outset that a large number of vending machines may be effectively serviced by this system, the two machines shown being only illustrative.

Both vending machines 10 and 12 and any additional machines, are coupled with a computer programmer 14 by coupling means 16. The programmer 14 controls the operation of the system in response to a signal from a vending machine indicating that a sale is being made. Such signal is provided by the master scanner 18 which sequentially applies an electrical signal to vending machine 10 and vending machine 12, and to other portions of the system to be hereinafter described. The vending machines are pulsed in rapid succession with only one machine receiving the electrical signal at a given time. This enables the remaining portions of the system to service a large number of vending machines rather than requiring additional credit system components or, in effect, a separate crediting system for each vending machine. The latter would, of course, be impossible from a practical standpoint due to economic considerations.

Assuming, for purposes of illustration, that the master scanner 18 is applying an electrical signal to vending machine 10, the basic operation of the system will be traced from the time a purchase is made from vending machine 10 until the time that the account of the customer is charged with the amount of the purchase. When a purchase is made at vending machine 10, circuitry therein permits the electrical signal to actuate the vending mechanism of the machine and produces a pulse for initiating the program of programmer 14. Simultaneously, the price register 20, and the customer register 22, are provided with information regarding the price of the vended item and the identification of the customer, respectively. The price register 20 is coupled with vending machine 10 by coupling means 24, the customer register 22 being coupled with vending machine 10 by coupling means 26. The price and customer registers receive this information and retain the same upon command from the programmer 14 along interconnecting means 28 and 30, respectively, and retain the information until a subsequent command from the programmer.

An accumulator 32 and a memory 34 for recording the balances of the customer accounts are provided to complete the credit system. After the information regarding the price of the purchase and the identification of the customer is received by the price register and customer register, the programmer 14 along coupling means 36 commands the memory to transfer the balance of the customer's account into the accumulator 32. This function is illustrated diagrammatically by the coupling line 38. At this point, the accumulator 32 adds the previous balance to the price information presently contained in price register 20. This action is illustrated by coupling lines 40 and 42 which illustrate that the programmer commands the price register to transfer the price information therein to the accumulator where totalization occurs. A subsequent command from programmer 14 then transfers the new customer balance for the accumulator back into the memory and the account of the customer is thus charged with the latest purchase. This final function is illustrated by the coupling line 44.

A read-out station 46 and an erase station 48 are also coupled with the output of the master scanner 18, and the electrical signal from the master scanner is applied to the read-out and erase stations sequentially with the vending machines. The read-out station 46 provides a visual display of the balance of a customer's account when the customer completes his purchases.

It may be noted that the read-out station is also connected with coupling means 16 and 26, the read-out station containing apparatus capable of initiating the program of programmer 14 and providing customer identification information for the customer register 22 in the same manner as the vending machines. The only difference between the sequence of events following the desire of a customer to ascertain his present balance and the sequence described above during vending is that the memory 34 now transfers the customer's balance to the read-out station along coupling means 50. Apparatus within read-out station 46 then displays the balance received from the memory. Depending on the type of retail operation with which the system is utilized, the customer may then pay for his purchases or his account debited by the read-out station personnel for subsequent billing.

It should be appreciated that if the capability of the memory employed in the system were such that a very large number of customer accounts could be stored therein, it would then be necessary that the memory be read out only at billing intervals by the retailer. For cash payment after the customer has completed his purchases, however, or in a credit system having a limited memory capability where read out and destruction of the memory are effected after purchases with subsequent recordation of the total of the purchases by the operating personnel, the read-out station would become part of the vending outlet operation and every customer would be required to pass through this station prior to leaving the vending area.

The erase station 48 is also coupled with the programmer 14 and customer register 22 by coupling means 16 and 26, respectively, and coupled with the memory 34 by coupling means 52 to provide a means of erasing the memory after the read-out of a customer's balance so that the memory may be later utilized for another customer. This erase station, of course, contemplates an arrangement such as above described wherein the customer pays cash at the close of his purchases or a limited memory is utilized. A memory without such limitation would only require erasing at the close of each billing.

The foregoing is a simplified presentation of the present invention and includes only the basic functions necessary to effect a credit vending system. The structure for effecting the functions above described will be discussed fully in subsequent parts of the specification. Such discussion must be preceded, however, with an explanation of the logic and electronic symbolism utilized in FIGS. 2–6 to show the structure comprising the various sub-assemblies of the present invention.

The operations performed by this invention are effected through the utilization of digital computer circuitry coupled with structure within the vending machines and the master scanner. The computer utilizes the binary number system and employs NOR logic. Being binary, two voltage levels are utilized in the logic corresponding to the 0 and 1 bits of the binary system. Although NOR logic is utilized, other logic could be employed with appropriate alterations of the circuitry within the capabilities of one skilled in the computer art. In the drawings it should be understood that a negative voltage level is a logic 1. Such negative logic is shown and is utilized only for purposes of illustration. Positive levels could also be employed with corresponding changes in the design of the circuitry, such design changes obviously being well within the capabilities of one skilled in the computer art.

Logic symbols are used to show the computer circuitry. The symbol shown for a NOR gate is the conventional arrowhead-like block, the logic information flowing in the direction of the arrowhead. A NOR gate is a well-known, conventional logic device which produces a voltage output level corresponding to the 1 bit of the binary system only if all of the inputs to the NOR are simultaneously maintained at the voltage level corresponding to the 0 bit. However, in NOR logic the 0 level may be duplicated by the mere absence of a voltage. In other words, no signal applied to the input of a NOR logic element has the same effect thereon from a logic standpoint as the application of a signal of the 0 logic level.

The various types of multivibrators employed in the computer circuitry are also shown in logic nomenclature. All multivibrators are shown in the figures by blocks having outputs labeled "0" or "1." Either of these outputs, or both, may be utilized in the circuitry depending on the particular use of the multivibrator. In the case of a bistable multivibrator commonly known as a "flip-flop," the inputs thereof may be labeled "S," "T" or "R." Inputs not utilized are not shown. For monostable multivibrators the single input thereof is labeled "T." The control input to an astable multivibrator is not labeled. Therefore, the three types of multivibrators may be distinguished when following the logic circuitry.

The power sources for the various NOR gates, multivibrators, and other devices in FIGS. 2–6 to be described hereinafter are not shown. The interconnections show only the flow of logic information, and only those power connections necessary for a complete understanding of the operation of the invention are shown. The appropriate power sources are omitted to avoid needless complication of the diagrams.

It should be understood that an astable multivibrator, when a signal of the 1 logic level is applied to its control input, generates pulse trains that are emitted simultaneously from the 0 and 1 outputs. The pulse train from the 1 output is identical with the pulse train from the 0 output except that the trains are inverted with respect to one another. In other words, when the voltage from the 1 output is at the 1 level, the voltage from the 0 output will be at the 0 level. As the voltage from the 1 output shifts to the 0 level, the voltage from the 0 output shifts to the 1 level, etc. Removal of the 1 level signal from the control input terminates the pulse train.

The monostable multivibrators normally generate a voltage equal to the 0 logic level at the output terminal denoted "1." However, upon application of a 1 command to the T input terminal, an output at the 1 level will appear at the 1 output terminal for the duration of the monostable multivibrator cycle. In other words, one pulse of the 1 level will appear at the 1 output when the monostable multivibrator is triggered.

The flip-flops are not shown in any given normal state, the state of the flip-flop being determined by the last input applied thereto. More specifically, when a 1 command is applied to the S input of the flip-flop, the flip-flop is placed in the 1 state or set condition and an output voltage equal to the 1 level is produced at the 1 output. Simultaneously, an output at the 0 level appears at the 0 output terminal. The foregoing occurs regardless of the prior state of the flip-flop.

Conversely, after a 1 command is applied to the R input of a flip-flop, the flip-flop is in the 0 state or the reset condition, and an output voltage equal to the 1 level is produced at the 0 terminal and an output equal to the 0 level appears at the 1 terminal. The occurrence of this state is also not dependent upon the prior state of the flip-flop. It should be understood that the flip-flops are of the AC reset type. Therefore, a 1 command once applied to an input terminal thereof need not be removed prior to application of a subsequent 1 command to another input terminal in order for the subsequent command to effect the desired change of state.

A 1 command applied to the T terminal of the flip-flop causes the flip-flop to change state. In other words, a flip-flop in the 1 state prior to the application of a 1 command to the T terminal will be placed in the 0 state subsequent to such input command. Conversely, a flip-flop in the 0 state prior to a 1 command being applied to the T input terminal will be placed in the 1 state prior to such input command.

*Vending apparatus, customer identification, and master scanner*

Figure 2:
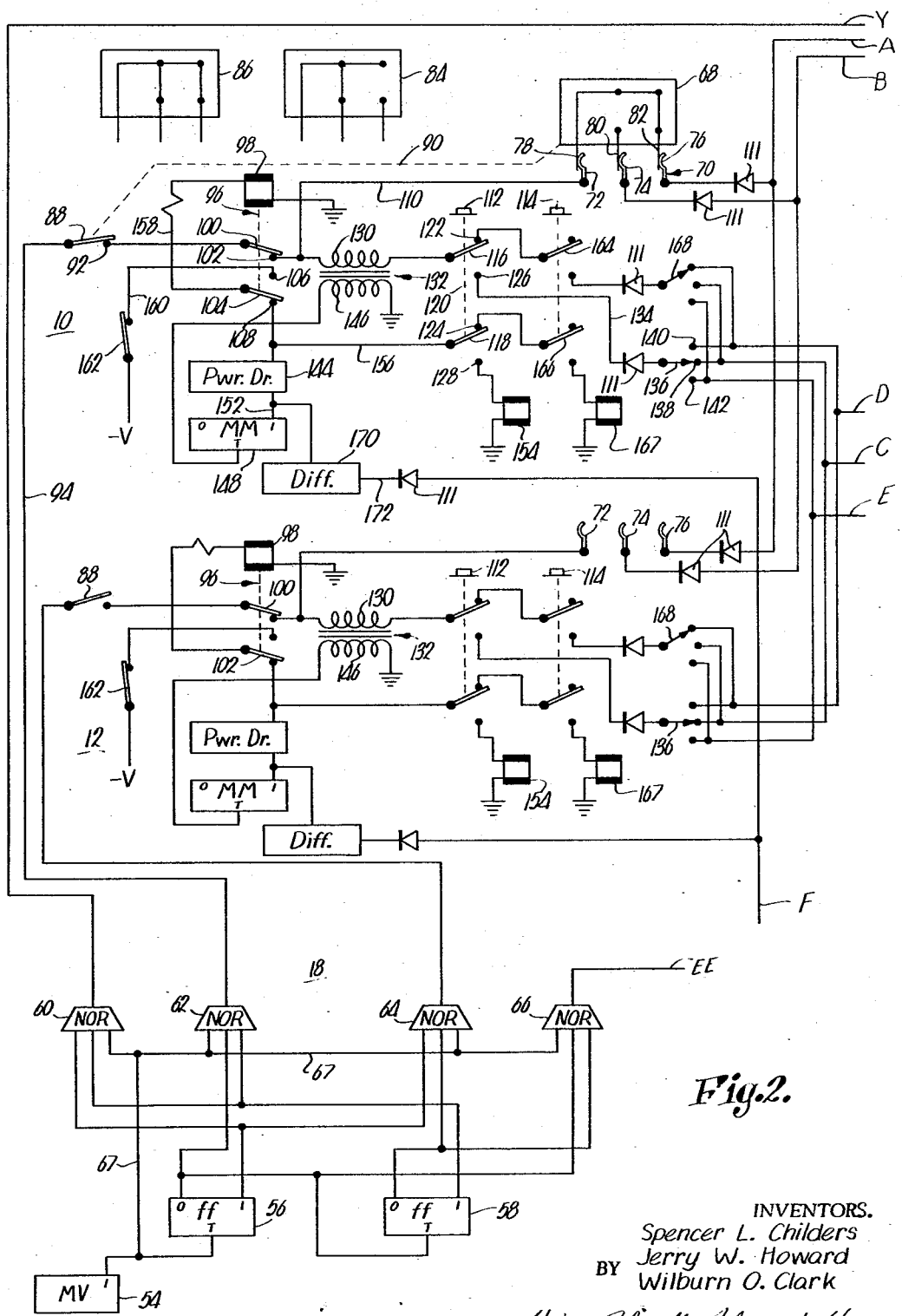
FIG. 2 is a schematic and logic diagram of the vending machine apparatus, master scanner, and the customer-identifying devices of the present invention.

Referring to FIG. 2, the control apparatus of the vending machines, the customer identification devices, and the master scanner is shown. The master scanner 18 is shown in the lower portion of FIG. 2. The master scanner comprises an astable multivibrator 54, flip-flops 56 and 58, and NOR gates 60, 62, 64 and 66. These components form a two-stage flip-flop counter which sequentially produces a voltage of the 1 level from the NOR gate outputs, respectively. The NOR gate outputs are mutually exclusive, only one NOR emitting a 1 command at a given time. A conductor 67 interconnects the 1 output terminal of mutivibrator 54 with one input terminal of each of the NOR gates 60–66. This connection is utilized to guarantee that there will be no output from any of the NOR's 60–66 while the flip-flops 56 and 58 are being triggered to their next counting state. Thus, the transient states are suppressed. It should be understood that the counter would be enlarged if a greater number of vending machines, read-out, or erase stations were employed in the system. The system shown having only two vending machines, one read-out station and one erase station, only four master scanner outputs are required.

The circuitry in the vending machines 10 and 12 is identical for each machine. The apparatus shown is only that necessary to the credit vending system. The remainder of the vending mechanism may be of various types conventional and widely used in the art. The operation of only one vending machine will be described as the circuitry of each machine performs in an identical manner.

The initiation of the system operation occurs when a customer-identification device or token 68 in the form of a card is inserted in the card-receiving structure 70 of a vending machine such as machine 10. Structure 70 comprises contactor arms 72, 74 and 76 which engage pins 78, 80 and 82 of the customer-identification device 68.

The customer-identification device illustrated diagrammatically in FIG. 2 is actually a simplified, but illustrative version of the device that would actually be employed in the practice of the invention. The apparatus as shown has only a three token capacity. Tokens 84 and 86 are the two other token configurations possible in the simplified system. It may be seen that the tokens have terminals which may be interconnected with the pins 78, 80 and 82 in one of three manners. First, the terminals may be interconnected such as shown for tokens 86 to interconnect all three of the pins. In token 84, only the two left-hand pins, as viewed in the drawings, are interconnected. In token 68, only the pins 78 and 82 are interconnected.

The customer-identification devices or tokens as shown could be composed of a thin plastic shell having the connections molded within the plastic to form a credit card-like device. In actual practice, the tokens would have many pins protruding therefrom so that a multitude of pin interconnection combinations would be possible. Furthermore, the receiving structure 70 in the vending machine would also be modified to fully utilize the additional pins to provide the desired number of possible combinations, each of said combinations representing and identifying a particular customer.

The token 68 is shown in FIG. 2 inserted in structure 70 and interconnected with a switch arm 88 by suitable coupling means 90. This switch configuration could be a limit switch type device operable by the leading edge or sides of the card token and operable to close when the card is inserted in the vending machine. Switch arm 88 is shown engaged with contact 92 under the effect of the inserted token 68, and thus a closed electric circuit exists through the switch arm 88 to contact 92.

When a pulse is applied by the master scanner 18 along conductor 94, vending machine 10 may vend an item. It should be understood that a vending machine will not vend an item nor initiate the programmer unless a pulse is made available thereto from the master scanner. In the case of vending machine 10, such pulse will be available along conductor 94 only when a voltage equal to the 1 level appears at the output of NOR gate 62 in master scanner 18. NOR logic circuitry is purposely chosen so that the voltage level corresponding to the 0 bit may be very small in magnitude as compared with the 1 bit, thereby insuring that the apparatus within the vending machines will respond only to a 1 command.

For further simplification of the circuitry vending machines 10 and 12 are only shown containing two vendible items of merchandise. Furthermore, these two items may only be priced at one, two, or three monetary denominational units. These monetary units may be cents, nickels, dimes, etc. Again, this is done for simplicity as a possible selection of only three prices illustrates the principle of operation as well as a larger possible selection.

It will be assumed that the customer has been issued token 68 by operating personnel upon entering the vending machine area. In the further description of the operation of the system it will be assumed that prospective customers are issued tokens as they enter the vending area and that cash is paid after all purchases are made prior to leaving the area. Therefore, after a given customer has utilized the issued token and paid for his items, the token may be utilized again by another customer. Of course, the prior memory must be erased at the erase station as described above before the new customer may be issued the card.

The operation of the system is best described by following the chain of events beginning with the initial purchase of a given customer and ending with the payment by such customer for his purchases and the erasing of the memory. When the token 68 is inserted into card-receiving structure 70 and a scanning pulse is transmitted along conductor 94 to switch arm 88, the engagement of switch arm 88 with its contact 92 makes the pulse from the scanner available to the internal circuitry of vending machine 10. It should be understood that all of the operations to follow will occur during the brief period of time that the scanning pulse is applied to vending machine 10.

A vending relay 96 having a relay coil 98, switch element 100 and its associated contact 102, and switch element 104 and its associated contacts 106 and 108, is provided within the vending machine 10, switch element 100 being connected in series with contact 92. Relay 96 is shown in its normal, deenergized position. It may be seen that when token 68 is inserted in structure 70, the scanning pulse will be conducted through switch element 100, contact 102, conductor 110, and contactor arm 72 or structure 70. The scanning pulse will then be conducted through the internal circuitry of token 68 to contactor arm 76 and hence, along interconnecting lead A to the customer register 22. A coupling diode 111 is interposed in series with interconnecting lead A to isolate the customer register from the circuitry of vending machine 10. (Such coupling diodes 111 are utilized throughout the interconnecting leads of the circuitry for purposes of isolation and will be denoted by reference character 111.)

Figure 4:
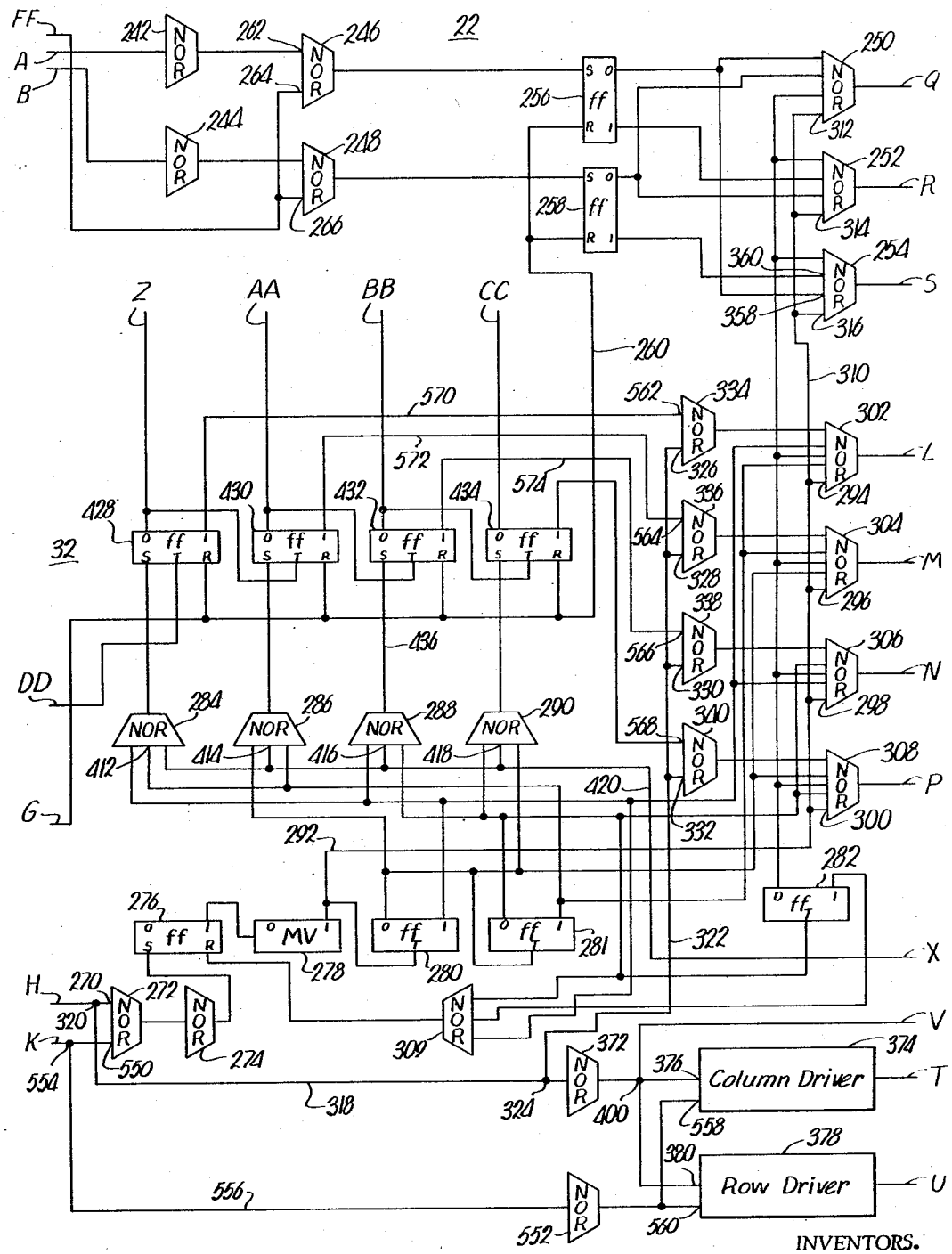
FIG. 4 is a logic diagram of the price register, accumulator, and pulse generator of the present invention.

The circuitry of the customer register 22 is shown in FIG. 4 and will be described fully hereinafter. As mentioned previously, the signal from the master scanner 18 is a voltage pulse equal to the 1 logic level. Thus, this logic pulse is now transmitted along interconnecting lead A to the customer register 22. This pulse, appearing on interconnecting lead A, identifies token 68 and, therefore, the customer using token 68. It should be appreciated that if token 84 were inserted in structure 70, the 1 pulse would appear on interconnecting leads B. Also, if token 86 were inserted, the 1 pulse would then appear on both interconnecting leads A and B. Therefore, the response of the customer register is different for each of the three possible token configurations of the simplified system shown.

Vending machine 10 is shown containing two possible items of merchandise corresponding to selector push buttons 112 and 114. Assuming that the customer wishes to select the item corresponding to push button 112, the button 112 is depressed to effect vending of the desired item. Single-pole, double-throw switches 116 and 118 are operably coupled with push button 112 by coupling means 120 such that when push button 112 is in its normal unoperated position, the switches 116 and 118 are in their upper positions as shown engaging contacts 122 and 124. When push button 112 is depressed to effect vending, switches 116 and 118 move to their lower positions thus engaging contacts 126 and 128. When this occurs, the pulse from the master scanner is conducted through the current-sensing winding 130 of driver transformer 132 to switch 116 and its contact 126, conductor 134, rotary price selector switch 136, and interconnecting lead C to the price register 20. It should be noted that the price selector switch 136 is set to engage contact 138, the resulting circuit to interconnecting lead C representing an item of two units price value. Price selector switch 136 could be set to electrically connect the pulse with interconnecting leads D or E merely by rotating the switch to engage contacts 140 or 142, respectively. A pulse appearing along interconnecting leads D or E would correspond to an item price of three units or one unit, respectively. Price register 20 is shown in detail in FIG. 3 and will be described fully hereinafter. At this point, therefore, both customer and price information is available to the price and customer registers.

The vending of the item of merchandise corresponding to selector button 112 is effected by coupling the pulse from the master scanner now flowing through winding 130 with the power driver 144 of vending machine 10. This coupling is effected by transformer 132, a pulse of proper magnitude appearing across secondary winding 146 and connected by conductor 150 to the T input terminal of monostable multivibrator 148. When thus triggered, a pulse is produced at the 1 output of monostable multivibrator 148. This pulse is connected with power driver 144 along conductor 152 and the function of the power driver is initiated. (Simultaneously, the pulse is made available to the programmer 14 to be described fully hereinafter.)

Power driver 144 may be a variety of controllable power sources capable of being momentarily actuated by a pulse signal applied to its control circuitry. Although it may be possible to operate the vending mechanism from the computer circuitry power sources, usually a higher load capability is required to effectively drive vending apparatus. Thus, power driver 144 functions as a power source of capacity sufficient to provide the currents drawn by the vending mechanism. The adaptation of such a power source to initiation by a voltage pulse such as provided by the monostable multivibrator 148 is well within the capabilities of one skilled in the art and, therefore, a complete description of such a device will not be undertaken in this specification.

The output of power driver 144 is coupled with vending solenoid 154 by conductor 156 and coupled with relay coil 98 by switch element 104, its associated contact 108, and holding circuit 158. Thus, power is made available to the vending solenoid 154 and the item of merchandise is vended to the customer. Furthermore, relay 96 is energized. It should be understood that the operation of a vending machine by such means as a vending solenoid is old in the art and a variety of equipment is commercially available that will effect the vending of items through the use of vending mechanism operable by such a solenoid.

Contacts 106 and 108 of relay 96 are of the make-before-break type. Contact 106 is connected to a power lead labeled +V by conductor 160, and a normally closed vending switch 162. Thus, the energizing current for the relay coil 98 is transferred from the power driver 144 to the power lead +V when relay coil 98 is energized by the power driver. Switch element 100 is disengaged from contact 102, thus disconnecting the vending apparatus from the output of the master scanner. When vending is completed, switch 162 is opened and relay coil 98 is de-energized. The relay 96 then returns to its normal deenergized state as shown in the drawings, and switch 162 returns to its normally closed position subsequent to the customer receiving the item of merchandise from the vending machine. The vending apparatus may then receive another pulse from the master scanner and effect vending of another item in the same manner as before.

The switch 162 may be coupled with a tray or receiving chute of a vending machine and be responsive to the presence of a vended item in said tray or chute. A pressure-sensitive switch could be utilized that is responsive to the weight of the vended item in the tray for instance. Therefore, when the customer removes the vended item from the tray or chute, the switch 162 again assumes its normally closed position.

The reason for the above sequence stems from the utilization of a scanning pulse as the basis for the actuation of the vending apparatus. It is quite possible that several pulses from the master scanner may be applied to the vending machine during the time that such machine is vending a single article. Therefore, such provision must be made in the vending machine apparatus, to insure that the customer will only be charged once for a given item. To insure this, the energizing time of the relay is made longer than the energizing time of the vending solenoid 154. This delay allows the price and customer registers sufficient time to receive the price and customer information before such information is removed by the energizing of relay 96 and thus the opening of the circuit through switch element 100 and its contact 102. In short, the price and customer registers must have the information before relay 96 pulls in. Therefore, the energizing times of the relay and the vending solenoid are adjusted to coincide with the speed of the information transfer. It will be appreciated, of course, that the speed of computer logic circuitry may be made extremely rapid, such that the necessary information may be transferred during the duration of a single scanning pulse. The operation of the make-before-break contacts 106 and 108, and the switch 162, then insures that the scanning pulse is not again made available to the vending machine until such time that the vended article is in the possession of the customer.

The operation of selector button 114, the ganged switches 164 and 166 coupled therewith, and vending solenoid 167, is identical to that as described for selector button 112 and will not be herein described. It should be noted that the rotary switch 168 associated with the selector mechanism of push button 114 is connected in parallel with rotary switch 136 so that the interconnecting leads C, D and E will be appropriately pulsed according to the price of the vended item.

*The computer programmer*

The price and customer registers and the other sub-assemblies of the present invention to be described hereinafter, are component parts of a digital computer operated by computer programmer 14. It is thus appropriate to next describe the operation of this programmer.

Referring to FIG. 2, it may be noted that a conventional differentiator 170 is coupled with the "1" output of monostable multivibrator 148. The differentiator differentiates the output pulse from the monostable multivibrator 148 to obtain positive and negative spike pulses in accordance with conventional differentiator design. These pulses appear at the output 172 of the differentiator which is coupled with diode 111. From diode 111 the negative spike is transmitted along interconnecting lead F to the programmer 14.

It should be appreciated that the differentiator serves to compress the pulse output from monostable multivibrator 148 to provide a pulse having a time duration no longer than the duration of a single pulse from the master scanner. This is requisite because the programmer must complete its program during the time duration of a scanning pulse.

Figure 3:
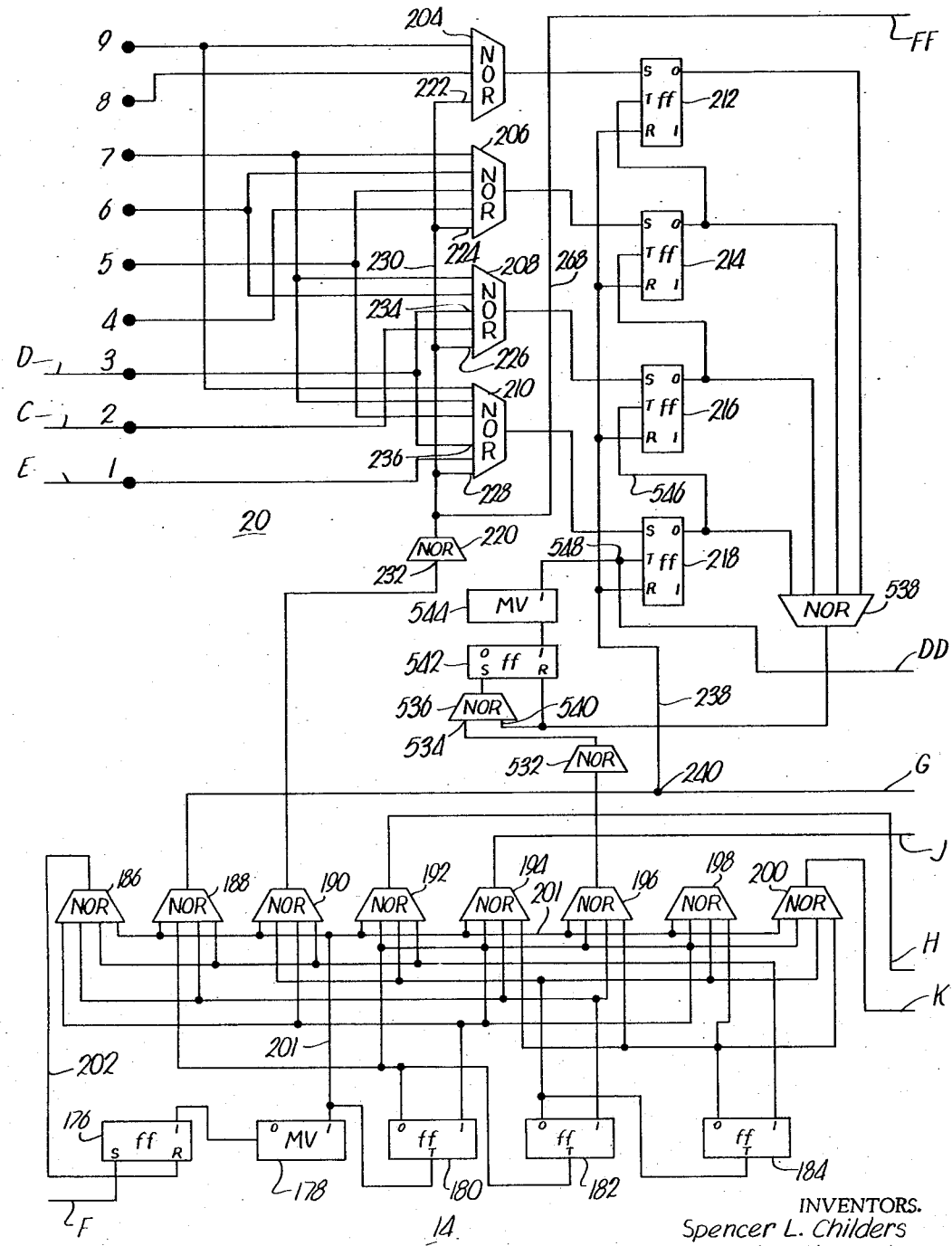
FIG. 3 is a logic diagram of the price register and the computer programmer of the present invention.

Referring to FIG. 3, it may be seen that the programmer 14 comprises a flip-flop 176 which drives a multivibrator 178 which, in turn, is connected to a three-stage flip-flop counter. The flip-flop counter comprises flip-flops 180, 182 and 184, and NOR gates 186, 188, 190, 192, 194, 196, 198 and 200. It should be noted that a conductor 201 interconnects the 1 output terminal of multivibrator 178 with one input of each of the NOR's 186–200 to suppress the transient states as previously described in the description of the counting circuitry utilized in the master scanner 18.

Flip-flop 176 is set by the spike pulse from differentiator 170 and is thus placed in the 1 state to trigger multivibrator 178. When triggered, multivibrator 178 is placed in the astable state and a pulse train is emitted from the 1 output terminal. This pulse train is fed to the T input of flip-flop 180 and hence, the counting operation begins. When counting commences, NOR gate 188 is the first gate to be fired, the remaining gates being fired in sequence from left to right as they appear in the drawings, until NOR gate 200 is fired. After the firing of NOR gate 200, NOR gate 186 is fired, and a 1 pulse is transmitted along conductor 202 to the R input terminal of flip-flop 176. Flip-flop 176 is thereby reset and the counter ceases operation until a subsequent spike pulse from the differentiator 170 again sets flip-flop 176.

The 1 command sequentially appearing from the NOR gates in the computer programmer, controls the sequence of the operation of the various subassemblies of the computer circuitry. Initially, the output from NOR gate 188 resets the flip-flops of the price register 20, cutomer register 22, and accumulator 32 so that their logic elements will be cleared of any prior information already disposed of by the computer. Therefore, the price register, customer register and accumulator are placed in condition to receive new customer and price information and dispose of the same in a manner to be described fully hereinafter.

The next NOR gate 190 commands the price and customer registers to receive the price and customer information available from the vending machine presently receiving an electrical signal from the master scanner and presently being operated by a customer for the vending of a desired item. NOR gate 192 then commands the computer memory to read out the prior balance of the particular customer now making a selection, such read-out information being transferred to the accumulator so that the price of the now vended item may be added to any old balance in the memory later in the computer program.

NOR gate 194 then makes a 1 command available to the read-out station 46 if the customer is actually at the read-out station with his token inserted therein so that the information read-out of the memory by the prior program step will be transferred directly through the accumulator to the read-out station. If this is the case, there will, of course, be no additional price data to be added to the prior memory. If, on the other hand, the cutomer is operating a vending machine, this step in the computer program is ineffective and the program proceeds to the next step.

NOR gate 196 delivers a 1 command to appropriate circuitry in the price register to effect read-out of the price information therein and transfer thereof to the accumulator where such price information is added to the information previously read out of the memory.

NOR gate 198 is shown for utilization if an additional decade is added to the system, but as it will be seen hereinafter, the simplified system here shown can handle only one decade of price information so that NOR gate 198 is not utilized. It should be understood that additional gating commands could be made available for additional decades by enlarging the flip-flop counter and providing additional programmer steps in accordance with conventional computer practices.

NOR gate 200 delivers a 1 command to appropriate computer circuitry for "writing" the total in the accumulator in the memory thus transferring the customer account information back to the memory for subsequent utilization. NOR gate 186 then resets flip-flop 176 as described above, and the programmer then stands by for the next command from a vending machine, the read-out station 46, or the erase station 48. As will be seen in the subsequent description of the specification, the erase station is coupled with the computer memory such that the account information of a particular customer will be destroyed upon the memory read command from NOR gate 192 when it is desired to erase the customer account.

Before proceeding with a description of the remainder of the computer circuitry, it should be noted that the interconnecting lead from the output of NOR gate 188 is labeled G, the interconnecting lead from NOR gate 192 is labeled H, the interconnecting lead from NOR gate 194 is labeled J, and the interconnecting lead from NOR gate 200 is labeled K. These interconnecting leads will also be labeled on the other drawings so that the various circuit diagrams appearing on separate drawings may be easily interconnected and followed.

*Price and customer information*

Referring to FIG. 3, the price register 20 is shown in the upper half of the drawings. Interconnecting leads C, D and E from the vending machines are shown connected respectively to terminals labeled "2", "3" and "1." The numerals denoting these terminals correspond to the number of units of price that a 1 pulse on the corresponding interconnecting lead represents. The remaining terminals 4–9 are shown to complete the decade, but such terminals are not utilized in the present simplified system as previously explained.

When the 1 command appears from the output of programmer NOR gate 190, the price register is then placed in condition to receive the price information from the vending machine. The price register is a decimal parallel to serial converter and its circuitry is arranged to utilize the binary complement code.

The converter portion of price register 20 comprises NOR gates 204, 206, 208 and 210, and flip-flops 212, 214, 216 and 218. A control NOR gate 220 is provided, the output thereof being connected to inputs 222, 224, 226 and 228 of NOR gates 204, 206, 208 and 210, respectively, by conductor 230. Prior to the 1 command from computer NOR gate 190, a voltage level corresponding to the 0 bit, of course, was present at the input terminal 232 of control NOR gate 220. Therefore, a 1 command appeared at the output of control NOR gate 220 and was coupled with the inputs 222, 224, 226 and 228 by conductor 230. Therefore, with the 1 command being applied to the aforesaid inputs, the outputs from NOR gates 204, 206, 208 and 210 were maintained in the 0 state.

With the application of a 1 pulse from NOR gate 190 to the input 232 of NOR gate 220, the output of NOR gate 220 will be placed in the 0 state. This will place the inputs 222, 224, 226 and 228 at the 0 level and thus allow the respective NOR gates of the converter to produce a 1 command at the outputs thereof if the other inputs of these NOR gates are also maintained at the 0 level. It may be appreciated that only those NOR gates 204–210 not receiving a 1 command from the vending machine will produce outputs at the 1 level.

The operation of the converter is best illustrated by an example. Assuming the vending of an item of three units price as described above, input 234 of NOR gate 208 and input 236 of NOR gate 210 will receive the 1 command from interconnecting lead D. Therefore, only NOR gates 204 and 206 will produce outputs of the 1 level when NOR gate 190 of the computer programmer emits the 1 command signal.

The 1 level outputs from NOR gates 204 and 206 set flip-flops 212 and 214, and a 0 level output therefore, appears at the 0 output terminals of flip-flops 212 and 214. Meanwhile, flip-flops 216 and 218 do not change their states as no triggering command is emitted from NOR gates 208 and 210. Flip-flops 216 and 218 are, therefore, in the reset condition with 1 level outputs appearing at their 0 output terminals. It should be understood that flip-flops 216 and 218, as well as flip-flops 212 and 214, were initially reset at the beginning of the computer program by the action of NOR gate 188 of the computer programmer, NOR gate 188 being connected to the reset terminals of the converter NOR gates by conductor 238 which connects with interconnecting lead G at junction point 240.

The reset condition of flip-flops 216 and 218 correspond to the "2" digit and "1" digit of the binary complement code, respectively. Therefore, the states of these flip-flops represent the digit "3." This information is retained in the converter flip-flops until the "add" step of the computer program.

The customer register 22 is shown in the upper portion of FIG. 4. The customer register comprises NOR gates 242, 244, 246, 248, 250, 252 and 254, and flip-flops 256 and 258. Interconnecting leads A and B are from contactor arms 76 and 74, respectively, of the card-receiving structure 70 of vending machine 10. (Interconnecting leads A and B are also connected with the corresponding contactor arms of vending machine 12.) In the example, the customer token 68 enables the signal from the master scanner to be connected with interconnecting lead A. Thus, the customer possessing token 68 causes a 1 pulse to appear on interconnecting lead A when he operates any of the vending machines. It will also be seen later in the specification that lead A also carries the scanner pulse when token 68 is utilized in the read-out station 46 or the erase station 48.

At the initial step of the computer program, the 1 pulse from NOR gate 188 resets flip-flops 256 and 258 by interconnecting the R terminals thereof with the output of NOR gate 188 along interconnecting lead G and conductor 260. The presence of a 1 pulse on interconnecting lead A, however, causes the output of NOR gate 242 to assume the 0 state, thus placing the input terminal 262 of NOR gate 246 at the 0 level. The remaining input terminal 264 of NOR gate 246, as well as input terminal 266 of NOR gate 248, will also be placed at the 0 level when NOR gate 190 is fired at the next step in the program. In FIG. 3 it may be seen that the resulting 0 level output from NOR gate 220 is transferred along conductor 268 to interconnecting lead FF. Therefore, the 1 command from NOR 190 produces a 1 level output from NOR gate 246 which sets flip-flop 256. The other NOR gate 248 is uneffected since no signal appears on interconnecting lead B when token 68 is utilized. Therefore, the preceding NOR gate 244 remains at its normal 1 state output. The setting of flip-flop 256 identifies the customer as possessing token 68 and this information is retained for use later in the program.

*Reading of the memory*

The next step in the computer program is the "read" command initiated from the output of NOR gate 192 in the computer programmer 14. The 1 command from NOR gate 192 is transmitted along interconnecting lead H to the circuitry shown in the lower portion of FIG. 4. The read command appearing on interconnecting lead H is connected to input terminal 270 of NOR gate 272. The output of NOR gate 272 is then changed to the 0 state and, hence, the output of NOR gate 274 is at the 1 state. The 1 output from NOR gate 274 sets control flip-flop 276, thus triggering multivibrator 278. When triggered, multivibrator 278 is of the astable type and a pulse train is emitted from its 1 output terminal. This pulse train will be hereinafter referred to as the strobe command. The strobe command triggers a three-stage flip-flop counter comprising flip-flops 280, 281 and 282, NOR gates 284, 286, 288 and 290, NOR gates 302, 304, 306 and 308, and NOR gate 309. NOR gates 284 and 302 have common inputs from flip-flops 280–282, as do NOR gates 286 and 304, NOR gates 288 and 306, and NOR gates 290 and 308. Thus, flip-flops 280, 281 and 282 operate two sets of counting NOR gates simultaneously.

The strobe command is transmitted along conductor 592 to inputs 294, 296, 298 and 300 of NOR gates 302, 304, 306 and 308. Lead 310 also connects the strobe command with inputs 312, 314 and 316 of NOR gates 250, 252 and 254 of the customer register 22.

The read command transmitted along interconnecting lead H is coupled with conductor 318 at junction point 320. Conductor 322 interconnects with conductor 318 at junction point 324. Thus, the 1 level read command is also applied to the input terminals 326–332 of NOR gates 334–340. It may be appreciated that the application of a 1 command to the aforesaid inputs of NOR gates 334, 336, 338, and 340 causes the outputs of these NOR gates to be at the 0 state. Furthermore, the outputs of these NOR gates are connected directly with one input of the NOR gates 302–308, thereby fulfilling one of the conditions on NOR's 302–308 for the production therefrom of a voltage at the 1 level.

The strobe output from multivibrator 278 also produces a 0 level condition at one of the inputs of each of the NOR gates 302–308 during one half cycle of the multivibrator output due to inputs 294–300 being coupled therewith as aforesaid. Therefore, during such half cycles, the outputs of NOR gates 302–308 will be at the 1 level when the remaining inputs to these NOR gates are at the 0 level due to the operation of flip-flops 280–282 in the counter. In short, NOR's 302, 304, 306 and 308 will, in that order, sequentially produce 1 commands during the appropriate counting interval when the strobe command is at the 0 level half cycle and when the read command is coupled with NOR gates 334–340.

It should be understood that the three-stage counter above described continues its counting function until a stop position is reached wherein flip-flop 280 is reset, 281 is set, and 282 is reset. Since the 1 output terminal of flip-flop 280, the 0 terminal of flip-flop 281 and the 1 output terminal of flip-flop 282 are each connected with the inputs of NOR gate 309, a 1 command will be emitted from NOR 308 when the flip-flops are in the aforesaid stop position states. The output of NOR 309 is connected to the R input terminal of flip-flop 276 to thereby reset flip-flop 276 and cease the operation of the counter when the stop position is reached. The stop position corresponds to the second counting state of the counter; the fourth, fifth, sixth and seventh counting states effect the sequential operation of NOR's 284–290 and 302–308.

Figure 5:
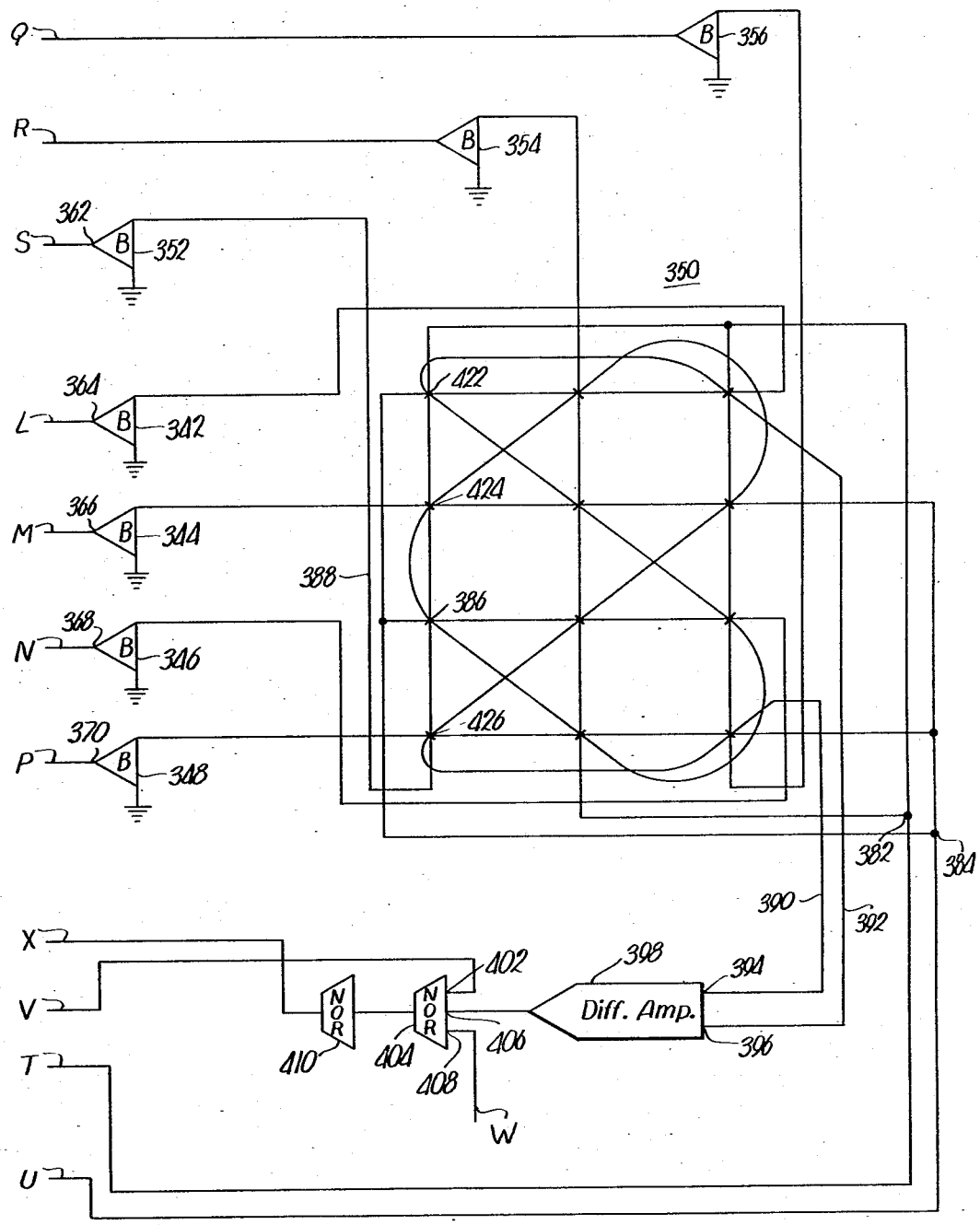
FIG. 5 is a block and schematic diagram of the memory core matrix, bilateral switches, and the gated differential amplifier of the present invention.

The interconnecting leads from the outputs of NOR gates 302–308 are labeled L, M, N and P, respectively. Referring to FIG. 5, it may be seen that these interconnecting leads are connected with bilateral switches 342, 344, 346 and 348. A complete description of these bilateral switches is presented in the copending application of Wilburn O. Clark and Herschell F. Murry, Ser. No. 227,369, filed Oct. 1, 1962, now abandoned.

The computer memory is shown in FIG. 5 and generally designated by the reference numeral 350. The memory illustrated is a conventional core matrix comprising rows and columns of bistate cores. The states of such cores correspond to the 0 and 1 bit of the binary system. These core matrices are conventional in the computer art and, in fact, are commercially available in the module form.

The bilateral switches 342–348 are used to enable the row exciting currents to traverse the corresponding row of the core matrix. One bilateral switch is utilized for each row. Since the currents in the cores are opposite during transfer of information into, and transfer of information out of the memory, the bilateral switches must be capable of handling bidirectional currents and must be responsive to a triggered input which will close the circuit through the bilateral switch. Therefore, with no input to the control terminal of the bilateral switch, the circuit therethrough is open and current will not flow through the corresponding row of the core matrix.

Bilateral switches of the same type are utilized to switch the columns of the core matrix. The column switching bilateral switches are designated 352, 354 and 356. It should be understood that a column of the matrix corresponds to one particular customer. Since the simplified system shown has only a three-customer capacity, there are three columns in the core matrix. There are, of course, four rows corresponding to the binary code.

As above stated, the strobe command from multivibrator 278 is also coupled with the inputs 312–316 of NOR gates 250, 252 and 254. These inputs are at the 0 level simultaneously with the inputs 294–300 of NOR gates 302–308. Also, referring to FIG. 4, flip-flop 256 in the customer register 22 is now set due to the configuration of the customer-identifying token 68 and the action of the circuitry as described for the preceding programmer step. Therefore, NOR gate 254 in customer register 22 will emit a 1 command from its output when the strobe command along lead 310 places input 316 at the 0 level. This will occur as the 0 terminal of flip-flop 256 is coupled with input 358 of NOR gate 254 and the 1 output terminal of flip-flop 258 is coupled with input 360 of NOR gate 254. Flip-flop 256 being in the set condition, the flip-flop 258 being in the reset condition, both inputs 358 and 360 will be at the 0 level.

The interconnecting leads from the outputs of customer register NOR gates 250–254 are labeled Q, R and S, respectively. Referring to FIG. 5, it may be seen that interconnecting lead S is connected with the control terminal 362 of bilateral switch 352. Therefore, during the 0 level half cycle of the strobe command, the 1 appearing at the output of NOR gate 254 will be coupled with the control input 362 of bilateral switch 352, thus closing said switch. Simultaneously, interconnecting leads L, M, N and P connected with switching terminals 364, 366, 368 and 370, respectively, of bilateral switches 342–348 will be sequentially transmitting 1 commands from NOR gates 302–308. Thus, the coincidence of row and column currents switch the selected core.

Having described the transfer of information during the read step of the program to the point where the NOR gates 250–254 and 302–308 are controlling the bilateral switches of the rows and columns of the core matrix, it is now appropriate to describe the current sources for the memory cores and the manner in which such sources are controlled during the read step.

Referring to FIG. 4, it may be seen that the read command transmitted along interconnecting lead H is connected to junction point 324 by conductor 318. From junction point 324, the read command is transmitted along conductor 322 to the NOR gates 334–340 to place one of the four inputs of each of the NOR gates 302–308 at the 0 level as previously described. Simultaneously, the read command from junction point 324 is transmitted to NOR gate 372 and the output of NOR gate 372 is thereby placed in the 0 state. This 0 level output from NOR gate 372 will hereinafter be referred to as the read' command as such command is a direct result of the read command, but is opposite thereto in binary language. The read' command is coupled with the core column driver 374 at the control input 376 thereof and is coupled with the core row driver 378 at the control input 380 thereof.

The core column and row drivers are conventional devices comprising current sources appropriate for exciting the particular memory cores utilized. The particular drivers utilized in the present invention are actuated by control voltage pulses of the 0 level. Drivers may certainly be utilized that are responsive to 1 level control. However, in the particular circuitry shown herein, the conversion of the read command to a read' command is particularly useful as will be seen hereinafter.

As previously stated, the cores of the memory matrix are bistate devices, the two states thereof corresponding to the 0 and 1 bit of the binary system. These cores are placed in one of the two states by the coincidence of two exciting currents, one of said currents being a current conducted through a particular row of the matrix, and the other current being a current conducted through a particular column of the matrix.

A commonly used core in the computer art is toroidal ferrite core having a nearly square hysteresis loop. Such cores will remain in either of two magnetic states corresponding to the 0 and 1 bit. The core is switched from one state to the other by magnetic domain reversal, such reversal being caused by the coincident currents discussed above. When the cores change from the state corresponding to the 1 bit to the state corresponding to the 0 bit, a pulse is given off. This pulse is transferred from the memory during read-out and corresponds to the information that particular core represents. It should be understood that when a 0 is read out of the core, no pulse is given off, since reading always returns the core to the state corresponding to the 0 bit. However, when a 1 is read out, the change from the 1 to the 0 state gives off a pulse of information.

The interconnecting leads from the outputs of the column driver 374 and the row driver 378 are labeled T and U, respectively. Referring to FIG. 5, it may be seen that interconnecting leads T and U are respectively connected to junction points 382 and 384. From these junction points, the driver outputs are routed to the columns and rows of the core matrix in accordance with well-known computer matrix circuitry. The exciting currents from the drivers however, do not traverse the rows and columns of the computer memory until the appropriate bilateral switch is closed.

The function of the bilateral switches may now be fully appreciated. Since the excitiing currents from the column and row drivers are also made available to the core memory by the read command, the actuation of a bilateral switch by the application of a 1 command to the control terminal thereof, completes the circuit from the corresponding driver output to ground, as illustrated by the ground connections to the bilateral switches. It should be understood that these ground connections merely illustrate the other electrical side of the core driver outputs.

Referring now to the example utilized earlier in the specification to illustrate the operation of the apparatus, a customer possessing token 68 has made a purchase of three units price. As previously described, token 68, through the action of the customer register 22, has caused a 1 command to be placed on the control terminal 362 of bilateral switch 352. Now, assuming that the total of the prior purchases of this customer equals four units price, such four units will presently be stored in the particular column of the core matrix representing his customer account. It is evident that this four units of price must now be added to the new three unit purchase. It is, therefore, first necessary that the old account balance be transferred from the memory to the accumulator 32 to be hereinafter described for addition of the old balance to the new purchase. As previously discussed, this transfer is the function of the read command.

The 1, 2, 4, 2* code is used in the accumulator, such code being only illustrative as other codes may be utilized with appropriate changes in the circuitry. The old balance of four units price must, therefore, be stored in a memory core corresponding to the "4" of the code. This core is designated 386, the column which core 386 is in being connected with bilateral switch 352 by conductor 388. (It should be understood that the cores of a particular matrix column from top to bottom as they appear in the drawings correspond respectively to the 1, 2, 4 and 2* of the code. Furthermore, it should be understood that the 2* character is utilized only in forming the digits 8 and 9.)

As the bilateral switches 342–348 are sequentially closed by NOR gates 302–308, the current from the output of row driver 378 will flow through the corresponding matrix row. Simultaneously, current will flow from the column driver 374 through the matrix column containing core 386 due to the action of bilateral switch 352. Since the two currents will only coincide in this latter column, only the cores therein will be effected. Furthermore, since core 386 is the only core therein presently at the 1 state, such core will be the only core that the coincident currents will cause to change state. This change of state produces an output from the core matrix which is coupled along conductors 390 and 392 to the inputs 394 and 396 of differential amplifier 398. The differential amplifier may be a conventional sense amplifier and serves to provide an output of binary logic level opposite to the logic level of the input. Therefore, the 1 command transmitted to the inputs 394 and 396 by core 386 will produce an output at the 0 level from the differential amplifier 398. (It will be understood, of course, that the voltage produced by a core during the transition from the state corresponding to the 1 bit to the state corresponding to the 0 bit will likely not be of a level equal to the logic level utilized by the computer. Therefore, the differential amplifier also serves to boost the voltage produced by the change of state to the logic level of the computer in accordance with practices well-known in the computer art.)

Referring to FIG. 4, it may be seen that the read' command from the output of NOR gate 372 is coupled with interconnecting lead V at junction point 400. Referring now to FIG. 5, it may be seen that interconnecting lead V is coupled with input 402 of NOR gate 404. The output from the differential amplifier 398 is coupled with input 406 of NOR gate 404. Interconnecting lead W is coupled with the remaining input 408.

Figure 6:
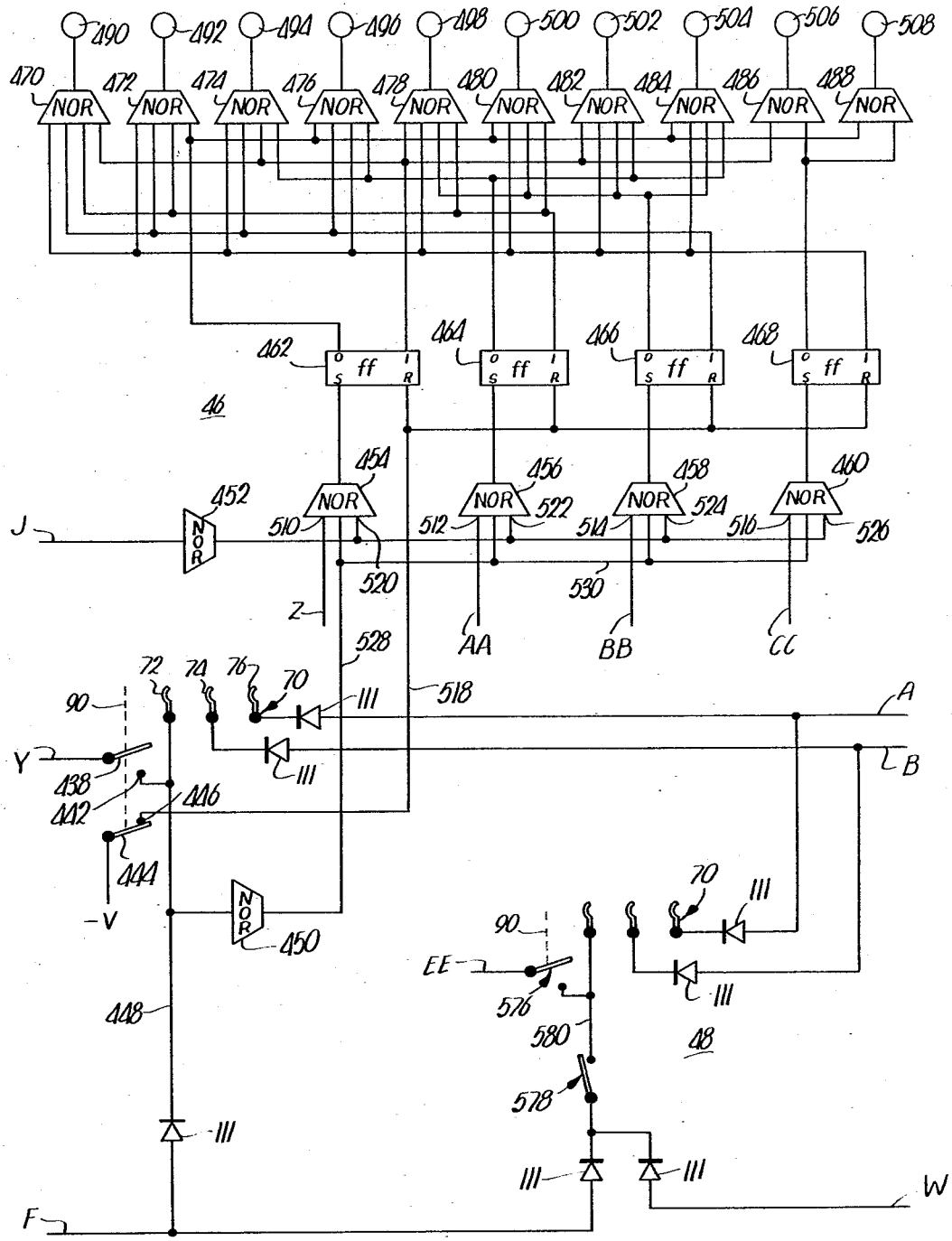
FIG. 6 is a logic and schematic diagram of the readout station and the erase station of the present invention.

Referring to FIG. 6, it may be seen that interconnecting lead W couples input 408 of NOR gate 404 with the circuitry of the erase station 48. For the moment, interconnecting lead W carries no voltage pulse and thus the input 408 has no voltage applied thereto. Since in the present example of the operation of the system the customer is operating a vending machine, the erase station 48 is not being utilized. In NOR logic no excitation to the input 408 of NOR gate 404 is equivalent to applying a 0 level voltage thereto and, therefore, when the erase station is not being utilized the input 408 may be considered in the 0 state.

Referring to FIG. 5, the output of the differential amplifier 398 applies a 0 level voltage to the input 406 of NOR gate 404 when the amplifier is excited by a pulse corresponding to the 1 logic level. Input 402 is in the 0 state due to the read' command being coupled thereto. Therefore, the change of state of core 386 during read-out of the memory produces a 1 level output from NOR gate 404 which, in turn, is coupled with the input of NOR gate 410. The output from NOR gate 410 will, therefore, be at the 0 level.

Interconnecting lead X couples the output of NOR gate 410 to the inputs 412, 414, 416 and 418 of NOR gates 284–290 shown in FIG. 4. This circuit may be traced along conductor 420 in FIG. 4. The 0 level output from NOR gate 410 places the inputs 412–418 in the 0 state and thus, allows the corresponding NOR gate to produce a 1 level output when such NOR gate is fired during the counting cycle effected by multivibrator 278 and flip-flops 280 and 282. As previously described, NOR gates 284–290 are sequentially fired from left to right as shown in the drawings simultaneously with the sequential firing of NOR gates 302–308 from top to bottom as shown in the drawings. Therefore, when NOR gate 306 closes bilateral switch 346, NOR gate 288 will also fire due to the presence of a 0 level voltage on input 416. Thus, destructive read-out of the information contained in core 386 is effected. The other NOR gates 284, 286 and 290 will not fire during the sequential firing of NOR gates 302, 304 and 308 because a 1 command will be applied to inputs 412, 414 and 418. NOR gates 284, 286 and 290 will thus be prevented from producing a 1 command at their outputs. Inputs 412, 414 and 418 are at the 1 level because the corresponding cores 422, 424 and 426 of the column strobed by the closing of bilateral switch 352 contain no information.

The accumulator 32 contains four flip-flops designated 428, 430, 432 and 434. The output of NOR gate 288 is coupled with the S input terminal of flip-flop 432 by conductor 436. Therefore, it may be seen that the 1 command from the output of NOR gate 288 representing the four monetary unit balance in the memory, sets flip-flop 432. The other flip-flops 428, 430 and 434 are similarly connected with NOR gates 284, 286 and 290, respectively, but these flip-flops are not set as, in the example, no information was recorded in cores 422, 424 and 426. Flip-flops 428, 430 and 434, therefore, remain reset due to the earlier application of a 1 pulse to the R input terminals thereof by NOR gate 188 of the programmer during the first step of the program. NOR gate 188 is connected with the accumulator flip-flops by interconnecting lead G.

*Transfer of the account balance to the read-out station*

In the next step of the computer program, a 1 command is emitted from the output of NOR gate 194 in the computer programmer and the account balance read out of the memory in the prior program step will be transferred to the read-out station for visual display of the customer's balance. This transfer will not occur, however, unless the customer-identifying token is inserted in the appropriate structure in the read-out station. Therefore, in the instant example, the programmer would proceed to the next step and there would be no information transfer to the read-out station. However, it will now be assumed, for purposes of illustration, that the customer possessing token 68 is utilizing such token at the read-out station rather than in vending machine 10, as previously assumed.

Referring to FIG. 6, the read-out station 46 is shown in the upper and left-hand portions of the figure. The readout station contains token-receiving structure similar to that as shown and described for the vending machines in FIG. 2. Therefore, like reference characters are utilized to denote like structure.

As with the vending machines, the read-out station must be coupled with a pulse from the master scanner before operation thereof may be effected. Therefore, it will also be assumed that a pulse from the master scanner is now available to the read-out station. Referring to FIG. 2, such pulse is made available from the output of NOR gate 60 and is coupled with the read-out station by interconnecting lead Y. Referring to FIG. 6, it may be seen that interconnecting lead Y is coupled with switch element 438 of a normally open, single-pole, single-throw switch having a contact 442. A normally closed second single-pole, single-throw switch is ganged therewith, said normally closed switch comprising switch element 444 and contact 446. Ganged switch elements 438 and 444 by coupling means 90 are responsive to the insertion of a token into structure 70 as previously described for the vending machine 10.

Contactor arms 74 and 76 of structure 70 are connected respectively by interconnecting leads B and A to customer register 22 in the same manner as the corresponding contactor arms in the vending machines. Thus, the card-receiving structure of the read-out station is actually parallel connected with the like structure of the vending machines. The read-out station is coupled with the computer programmer 14 through interconnecting lead F, isolation diode 111, and conductor 448. Interconnecting lead F is connected to the S terminal of flip-flop 176 in the computer programmer in the same manner as for the vending machines 10 and 12.

The remainder of the read-out station comprises control NOR gates 450, 452, 454, 456, 458 and 460, flip-flops 462, 464, 466 and 468, indicator NOR gates 470, 472, 474, 476, 478, 480, 482, 484, 486 and 488, and read-out indicators 490, 492, 494, 496, 498, 500, 502, 504, 506 and 508. The inputs 510, 512, 514 and 516 of control NOR gates 454–460 are coupled respectively with the 0 output terminals of accumulator flip-flops 428–434 by interconnecting leads Z, AA, BB and CC. The input of control NOR gate 452 is coupled with the output of programmer NOR gate 194 by interconnecting lead J.

With token 68 inserted in structure 70 of the read-out station 46, switch elements 438 and 444 are actuated by coupling means 90. The actuation of these switches move switch element 438 into engagement with contact 442 and opens the circuit from switch element 444 to contact 446. The opening of the circuit from switch element 444 to contact 446 breaks the circuit that previously existed from the —V supply lead, through conductor 518 to the R terminals of flip-flops 462–468. Subsequent closure of this circuit by removal of the customer token following read-out, will again engage switch element 444 with contact 446 and thereby reset the flip-flops 462–468 to clear these flip-flops of the prior read-out information and thus place the flip-flops in condition to again perform their function when a customer token is inserted in structure 70. Engaging switch element 438 with contact 442, allows the scanning pulse along interconnecting lead Y to be coupled with the token-receiving structure 70 and thereby renders the read-out station operable when a scanning pulse appears on interconnecting lead Y. Structure 70 then performs in the same manner as for the vending machines, and the customer-identifying information is transferred along interconnecting leads A and B to customer register 22.

The engagement of switch element 438 with contact 442 also couples the scanning pulse with conductor 448, isolation diode 111, and interconnecting lead F to the S input terminal of flip-flop 176 in the programmer 14. This places flip-flop 176 in the 1 state and initiates the program in the same manner as the program is initiated when a customer token is inserted in a vending machine and an item is selected.

The programmer then proceeds with the program steps as previously described. When the program step reaches NOR gate 194 of the programmer, the 1 command output from NOR gate 194 is transmitted along interconnecting lead J to the control NOR gate 452 in the read-out station 46. A 0 level output is thereby produced from NOR gate 452 which is coupled with inputs 520, 522, 524 and 526 of control NOR gates 454–460. Simultaneously, the 1 level scanning pulse from the master scanner is applied to the input of control NOR gate 450 by the coupling of said input with interconnecting lead Y from the master scanner through the engagement of switch element 438 with contact 442. The 0 level output from NOR gate 450 is then coupled with the remaining input of each of the NOR gates 454–460 by conductors 528 and 530. Thus, the action of NOR gates 452 and 450 provides 0 level inputs to two of the three inputs of NOR gates 454–460.

Referring to FIG. 4, it may be seen that the 0 output terminals of accumulator flip-flops 428–434 have interconnecting leads Z, AA, BB, and CC connected thereto, respectively. Referring to FIG. 6, these interconnecting leads are respectively coupled with inputs 510–516 of NOR gates 454–460. Therefore, the flip-flops 428–434 which are in the 1 state, will place a 0 level input signal on the corresponding NOR gate input in the read-out station and the outputs of such NOR gates will thereby be placed at the 1 level. Since the outputs from these NOR gates are coupled directly with the S input terminals of flip-flops 462–468, the flip-flops 462–468 will be placed in the 1 state by the 1 level output from the corresponding NOR gate. In other words, flip-flops 462–468 in the read-out station will each be placed in the same state as the corresponding flip-flops 428–434 in the accumulator 32.

Assuming that the customer balance is equal to four price units, flip-flops 466 will be set in the 1 state or NOR gate 458 will have all its inputs at the 0 level due to flip-flops 432 being in the 1 state. The manner in which read-out of four units price from the computer memory sets flip-flop 432 was discussed above. The flip-flops 462–468 of the read-out station 46, and the indicator NOR gates 470–488, then serve to convert the binary information received by flip-flops 462–468 into decimal information for actuating the indicators 490–508. The read-out station, therefore, functions as a parallel-to-parallel converter of binary information into decimal information.

The parallel-to-parallel converter in the read-out station necessarily utilizes the 1, 2, 4, 2* code, as such code is utilized by the accumulator and the states of flip-flops 462–468 merely duplicate the states of the corresponding flip-flops in the accumulator. Flip-flop 462 in the set condition would correspond to the decimal digit "1," flip-flop 464 in the set condition would correspond to the decimal digit "2," flip-flop 466 in the set condition would correspond to the decimal "4," and the set condition of flip-flop 468 would correspond to the "2*" character. Therefore, in the instant example, the set condition of flip-flop 466 allows only the NOR gate 478 to produce an output at the 1 level. The circuitry may be traced and it will be seen that NOR gate 478 is the only indicator NOR gate having all of its input terminals at the 0 level. The operation of the parallel converter will not be further described as such are conventional in the computer art.

The indicators 490–508 from left to right as they appear in the drawings correspond to the decimal digits 0 to 9. Therefore, the actuation of indicator 498 by the 1 command from NOR gate 478, indicates to the customer that his balance is equal to four price units. In this simplified system, these indicators could be electric lamps responsive to the voltage of the 1 logic level. The indicators could be arranged on a panel and labeled with the corresponding digit. It is evident, however, that in more sophisticated systems, such indicating means would not be desirable as, if additional decades are needed the indication from the lamps could be confusing to some customers. Therefore, the indicators represented by 490–508 may be a variety of conventional digital read-out means adapted to visually display the customer balance. The design and operation of such read-out devices are well within the capabilities of one skilled in the art and will not be hereindescribed.

*The addition step of the computer program*

It should first be understood that if read-out was effected during the program step just described, there will be nothing to add at the step of the program to be hereinafter described. The reason for this is simply that if the customer was at the read-out station he obviously was not at a vending machine and, therefore, could not have purchased anything.

Assuming, however, that the customer is operating vending machine 10 as earlier described, it is then the function of this step of the program to add the balance of the customer account previously read-out of the memory to the price of the new purchase. In the example, the customer possessing token 68 has purchased an item of three units price and such price information has been received by the price register 20. Referring to FIG. 3, the flip-flops 212 and 214 are set, and the flip-flops 216 and 218 of the price register 20 are reset. At the add step of the program, a 1 command appears at the output of NOR gate 196 and this command is coupled with the input of NOR gate 532. The 0 level output from NOR gate 532 is coupled with input 534 of NOR gate 536. If all of the price register flip-flops 212–218 are *not* set, then a 0 level signal will be produced at the output of NOR gate 538. Conversely, if all of the flip-flops 212–218 are set, then a 1 level signal will appear at the output of NOR gate 538.

It may be appreciated that the only time at which all of the price register flip-flops will be set, is when there is no price information in the price register. The flip-flops will all be set if no price information is in the price register due to the action of the circuitry when NOR gate 190 of the programmer was fired. Such condition, of course, occurs when the customer is not operating a vending machine but is, for example, at the read-out station.

Since, in the example, flip-flops 212 and 214 are set and flip-flops 216 and 218 are reset, the output from NOR gate 538 is at the 0 level and, therefore, a 0 level signal appears at the input 540 of NOR gate 536. Inputs 534 and 540 now both being at the 0 level, the output of NOR gate 536 is at the 1 level, and flip-flop 542 is thereby set. This triggers multivibrator 544 which is of the astable type when triggered. The pulse train from the 1 terminal of the multivibrator is fed to the T terminal of flip-flop 218. This causes flip-flop 218 to change from the 0 state to the 1 state.

The next pulse from multivibrator 544 reaching the T input terminal of flip-flop 218 causes flip-flop 218 to again resume the 0 state and thus an output at the 1 level appears at the 0 terminal of flip-flop 218. This 1 level voltage is coupled with the T input terminal of flip-flop 216 by conductor 546 and flip-flop 216 thereby changes to the 1 state.

The third pulse from the multivibrator then causes flip-flop 218 to change state again and places flip-flop 218 in the 1 state. Thus, at the end of three pulses from multivibrator 544, all of the flip-flops 212–218 are in the 1 state or set condition. At this time, as previously described, a 1 level voltage will be produced at the output of NOR gate 538. This 1 level voltage is simultaneously applied to the input terminal 540 of NOR gate 536, and the R terminal of flip-flop 542. Thus, the output of NOR gate 536 ceases to be at the 1 level and flip-flop 542 is reset. This removes the 1 level voltage from the triggering input of multivibrator 544 and the multivibrator ceases operation.

Interconnecting lead DD is connected with the output of multivibrator 544 at junction point 548. Referring to FIG. 4, it may be seen that interconnecting lead DD is coupled with the T input terminal of flip-flop 428 in accumulator 32. Thus, the pulse train from the multivibrator is transmitted along interconnecting lead DD to the accumulator. In the instant example, this pulse train contained three pulses corresponding to the three units price of the vended item. Addition of the three units price to the four units previously contained in the memory, is now effected in the accumulator flip-flops 428–434. Flip-flop 432 is in the 1 state representing the four units transferred from the memory to the accumulator during the read step of the program as previously described. As the three pulses from the multivibrator 544 appear at the T input of flip-flop 428, the accumulator flip-flops undergo the appropriate changes of state until after the third and last pulse from the multivibrator, flip-flops 428, 430 and 432 are in the 1 state. Since flip-flops 428, 430 and 432, respectively, correspond to the digits "1," "2," and "4," the digit "7" is now represented in binary coded form by the states of the flip-flops.

*Transfer of the new customer balance from the accumulator to the memory*

NOR gate 198 in the computer programmer 14 indicates the manner in which the carry condition would be handled if more than one decade were employed in the circuitry. However, the simplified system shown, uses only a single decade and, therefore, NOR gate 198 is not utilized.

NOR gate 200 of the computer programmer is fired next, and the 1 command from the output thereof is coupled with input 550 of NOR gate 272 by interconnecting lead K, shown in FIG. 4. The 1 command from NOR gate 200 of the computer programmer will be hereinafter referred to as the "write" command as this is the program step in which the new customer balance is written or recorded in the memory. Referring to FIG. 4, the input of NOR gate 552 is connected with interconnecting lead K at junction point 554 by conductor 556. Thus, the write command appears at the output of NOR gate 552 as a write' command or a voltage of 0 level. This nomenclature is analogous to that used during the read step of the program, the write' command being utilized to actuate the core drivers 374 and 378.

It will be noted in FIG. 4 that the write' command from the output of NOR gate 552 is coupled with inputs 558 and 560 of the column driver 374 and row driver 378, respectively, and that these inputs are different than the inputs 376 and 380 which receive the read' command. Separate inputs for the read' commands are shown to indicate that the exciting currents for the memory matrix made available by the read' and write' commands, are not the same. The current conducted through the core matrix during read-out of the memory is opposite in polarity to the current conducted therethrough during the write step of the program or the transfer of the new balance into the memory. This polarity difference is in accordance with well-known principles of core matrix operation, the fundamentals of such operations having been discussed earlier in the specification when the functioning of the computer circuitry was discussed during the read step of the program.

Besides the opposite polarity of the core driving currents, the only other difference between the read step and the write step is in the operation of NOR gates 334, 336, 338 and 340. With regard to these NOR gates 334–340 during the read step, the respective input terminals 326–332 thereof were maintained at the 1 level due to the presence of the read command on conductor 322. However, during the write step, conductor 322 is not excited and, therefore, the inputs 326–332 are at the 0 level. Thus, for a 0 level output to appear from NOR gates 334–340, the remaining input terminals 562, 564, 566 and 568, respectively, must be at the 1 level. The only way that these inputs can be at the 1 level is for the corresponding accumulator flip-flops 428–434 to be in the 1 state.

In the instant example, flip-flops 428, 430, 432 are in the 1 state and representing the digit "7." The 1 terminals of these flip-flops 428–432 are connected respectively, with inputs 562, 564 and 566, respectively, by conductors 570, 572 and 574. Therefore, when the multivibrator 278 and flip-flops 280 and 282 commence operation as in the read step, 1 commands will appear from the outputs of NOR gates 302, 304 and 306 only. Interconnecting leads L, M and N are, respectively, connected to the outputs of NOR gates 302, 304 and 306. Therefore, referring to FIG. 5, it may be seen that only the bilateral switches 342, 344 and 346 will be closed during the write operation. Since bilateral switch 352 will be closed by customer token 68, cores 422, 424 and 386 will be excited by the coincident writing currents and thereby placed in the 1 state to store the new seven unit balance in the memory.

The counter of the computer programmer 14 then fires the NOR gate 186 and flip-flop 176 is reset. This ends the computer program until a subsequent pulse is transmitted along interconnecting lead F to again set flip-flop 176.

*The erase station*

Referring to FIG. 6, the erase station 48 is shown in the lower right-hand portion of the figure. The erase station utilizes token-receiving structure 70 and coupling means 90 identical to that used in the vending machines and read-out station. The contactor arms of the structure 70 are coupled with interconnecting leads A and B to transfer customer information to the customer register in the same manner as for the vending machines and read-out station.

A normally open, single-pole, single-throw switch 576 is operated by the customer token through coupling means 90 when the token is inserted in structure 70. Switch 576 is coupled with the output of NOR gate 66 of the master scanner 18 by interconnecting lead EE. Switch 576 is connected to a manually operable, normally open single-pole, single-throw switch 578 by conductor 580. Therefore, when switch 578 is closed and when customer token is inserted in structure 70, switch 576 is closed by coupling means 90, and circuits are closed from the interconnecting lead EE through switch 576, conductor 580 and switch 578, and hence through the coupling diodes to interconnecting leads F and W. When a scanning pulse is available on interconnecting lead EE, the pulse is then routed along interconnecting lead F to commence the computer program as previously described, and also routed along interconnecting lead W to input terminal 408 of NOR gate 404 shown in FIG. 5. The computer program then progresses to the read step, at which time the memory is destroyed by blocking the output of the differential amplifier 398 through NOR gate 404. It may be appreciated that the 1 command from the master scanner applied to input 408 of NOR gate 404, prevents this NOR gate from producing a 1 level output, thereby forever erasing the computer memory.

The disposition of switch 578 will depend on the particular credit system being utilized. For example, if cash is to be paid after the customer completes his purchases, then switch 578 would be made accessible to the operating personnel so that the balance of a customer can be erased after the customer has paid. Customer tokens could then be collected and reissued to subsequent customers.

In credit systems analogous to those used by ordinary retail outlets, the erase station would be omitted from the vending area as the erasing function would be controlled by the operating personnel at the end of each billing cycle. Therefore, it may be seen that the particular time and manner of erasing the memory is wholly dependent upon the type of credit system utilized and the physical layout of the vending area.

*System speed and operational capabilities*

Ultimately the speed of information handling depends on the state of the computer art, and particularly on the development of electronic devices for handling digital computer information. However, practical guide lines can now be considered as it is only necessary for satisfactory operation of the system that its speed be such that a purchaser is unaware of any discontinuity of service.

The frequencies of the multivibrators 54, 178, 278, and 544 control the speed of the information transfer. Multivibrator 54 in the master scanner is the basis for this speed control as this multivibrator determines the speed with which the vending machines, the read-out station and the erase station will be sequentially pulsed.

Multivibrator 178 in the computer programmer must then operate at a frequency at least eight times higher than multivibrator 54 so that the steps of the computer program may be all be completed during one pulse from the master scanner. Accordingly, multivibrator 544 in the price register, and multivibrator 278 (which generates the strobe command) must be of sufficiently higher frequencies so that their functions within a given computer step may be completed.

If the frequency of multivibrator 54 in the master scanner were to be very conservatively set at one kilocycle, a given vending machine in the simplified system described herein would receive a scanning pulse every 0.008 second. Enlarging the system to facilitate ninety-eight machines plus the read-out station and the erase station would still enable each unit to be pulsed every 0.2 second. The multivibrator frequencies involved for this master scanner speed are well within the transfer capabilities of existing computer circuit elements. Therefore, it may be seen that even when the system shown is enlarged to handle ninety-eight vending machines, the pulse speed is such that a purchaser would not be aware of any discontinuity of service.

In the foregoing description it is evident that the honesty of the customers utilizing the customer tokens is assumed. Therefore, the validity of the customer tokens is necessarily also assumed. However, from a practical standpoint, it may be necessary to provide the apparatus of the present invention with means whereby the validity of the customer tokens inserted into the various card-receiving structures may be ascertained. In conjunction with this function it may further be necessary to provide means of preventing operation of the vending machines without the use of a customer token, such as by insertion of wire probes or the like into the card-receiving structure to trip the switch that allows the master scanner pulse to be coupled with the vending and crediting apparatus.

A number of means may be utilized to effect the checking of the customer tokens and to prevent tampering with the vending machines. For example, an additional row of memory cores could be added to the memory matrix to provide an additional core for each column. This additional core and its associated circuitry could be electrically interposed between each vending apparatus and its token actuated switch (which allows the scanning pulse to actuate the vending mechanism) in a manner such that actuation of the switch would be effective only if a valid card were utilized. One of the states of the core would correspond to a valid card while the other state would represent an invalid card. The state of each core would be under the control of operating personnel responsible for card validation. Thus, the mere actuation of the switch could not effect vending unless a valid token was actually used to trip the switch. Validation could be effected initially before the customer is allowed to proceed to the vending area.

Having thus described the invention, what is claimed as new and desired to be secured by Letters Patent is:

1. In a credit vending system:
   a plurality of vending machines, each of said machines including structure for receiving a customer-identifying device, switching means operable by said device when received by said structure, and electrically responsive vending means coupled with said switching means for initiating the vending of a selected item of merchandise;
   electrically responsive price register means operably coupled with the switching means of each of said machines for receiving the price of vended items;
   electrically responsive customer register means operably coupled with the switching means and device receiving structure of each of said machines for receiving customer identification information from said device; and scanner means operably coupled with the switching means of each of said machines for sequentially applying an electrical signal thereto whereby, when the switching means of one of said machines is operated by said device and said electrical signal is applied to the switching means of said one machine, the electrically responsive vending means of one said machine initiates the vending of the selected item, said price register means receives the price thereof and said customer register means receives the customer identification information.

2. In a credit vending system as set forth in claim 1, wherein is provided memory means operably coupled with said price register and customer register for receiving said price and customer identification information and storing said price information in a manner correlated with said customer identification information, whereby to charge the account of the customer with the amount of the purchase.

3. The invention of claim 2, wherein is included means operable to clear the price and customer registers after said price information is stored by said memory means, whereby said price and customer registers may then sense the next purchase.

4. In a credit vending system:
a plurality of vending machines, each of said machines including structure for receiving a customer-identifying device, switching means operable by said device when received by said structure, and electrically responsive vending means coupled with said switching means for initiating the vending of a selected item of merchandise;
electrically responsive price register means operably coupled with the switching means of each of said machines for receiving the price of vending items;
electrically responsive customer register means operably coupled with the switching means and device receiving structure of each of said machines for receiving customer identification information from said device;
scanner means operably coupled with the switching means of each of said machines for sequentially applying an electrical signal thereto whereby, when the switching means of one of said machines is operated by said device and said electrical signal is applied to the switching means of said one machine, the electrically responsive vending means of said one machine initiates the vending of the selected item, said price register means receives the price thereof and said customer register means receives the customer identification information; and
means operably coupled with said price register and said customer register including memory means for storing the balances of the customer accounts, accumulator means for adding the price received by the price register to the corresponding customer balance in the memory means, and means for transferring the total from the accumulator to the memory means.

5. The invention of claim 4, wherein is included means operable to clear the price register, customer register, and accumulator after the total is transferred to the memory means, whereby said price and customer registers may then sense the next purchase.

6. The invention of claim 5, wherein is included programmer means responsive to said electrical signal for sequentially controlling the functions of the price register, customer register, accumulator, total transfer means, and clearing means, and circuit means coupling said programmer means with the switching means of each of said machines.

7. The invention of claim 5, wherein is included a read-out station comprising apparatus for receiving said device, read-out switching means operable by said device when received by said apparatus, and means for indicating the balance of the customer account corresponding to the customer identified by said device, and wherein is included means operably coupling said scanner means with said read-out switching means for applying said electrical signal thereto sequentially with said machines, means operably coupling said customer register with said read-out switching means and device receiving apparatus, and electrically responsive transfer means operably coupled with said read-out switching means, said indicating means, and said memory means for transferring the customer balance from said memory means to said indicating means when said last-mentioned transfer means is coupled with said electrical signal.

8. The invention of claim 7, wherein is included an erase station comprising an assembly for receiving said device and erase switching means operable by said device when received by said assembly, means operably coupling said scanner means with said erase switching means for applying said electrical signal thereto sequentially with said machines and read-out station, means operably coupling said customer register with said erase switching means and device receiving assembly, and electrically responsive erasing means interconnecting said erase switching means and said memory means for erasing the balance of the customer account corresponding to the customer identified by said device when said erasing means is coupled with said electrical signal.

9. In a credit vending system:
a plurality of vending machines, each of said machines including structure for receiving a customer-identifying device, switching means operable by said device when received by said structure, and electrically responsive vending means coupled with said switching means for initiating the vending of a selected item of merchandise;
a read-out station comprising apparatus for receiving said device, read-out switching means operable by said device when received by said apparatus, and means for indicating the balance of the customer account corresponding to the customer identified by said device;
an erase station comprising an assembly for receiving said device, erase switching means operable by said device when received by said assembly, and a manually operable switch coupled with said erase switching means;
electrically responsive price register means operably coupled with the switching means of each of said machines for receiving the price of vended items;
electrically responsive customer register means operably coupled with the switching means and device-receiving structure of each of said machines, said read-out switching means and device receiving apparatus, and said erase switching means and device receiving assembly for receiving customer identification information from said device;
means operably coupled with said price register and said customer register including memory means for storing the balances of the customer accounts, accumulator means for adding the price received by the price register to the corresponding customer balance in the memory means, and means for transferring the total from the accumulator to the memory means;
means operable to clear the price register, customer register, and accumulator after the total is transferred to the memory means, whereby said price and customer registers may then store the next purchase;
scanner means operably coupled with the switching means of each of said machines, said read-out switching means, and said erase switching means for sequentially applying an electrical signal thereto whereby, when the switching means of one of said machines is operated by said device and said electrical signal is applied to the switching means of said one machine, the electrically responsive vending means of said one machine initiates the vending of the selected item, said price register means receives the price thereof and said customer register means receives the customer identification information;

electrically responsive read-out transfer means operably coupled with said read-out switching means, said indicating means, and said memory means for transferring the customer balance from said memory means to said indicating means when said electrical signal is applied to said read-out switching means and said read-out switching means is operated by said device;

electrically responsive erasing means interconnecting said erase switching means, said switch, and said memory means for erasing the balance of the customer account corresponding to the customer identified by said device when said electrical signal is applied to said erase switching means, said erase switching means is operated by said device, and said switch is operated; and programmer means responsive to said electrical signal for sequentially controlling the functions of the price register, customer register, accumulator, total transfer means, clearing means, and read-out transfer means, and circuit means coupling said programmer means with the switching means of each of said machines, said read-out switching means, and said erase switching means.

References Cited

UNITED STATES PATENTS

| | | | |
|---|---|---|---|
| 2,905,926 | 9/1959 | Ald | 340—147 |
| 2,970,877 | 2/1961 | Parsons | 346—34 |
| 2,975,282 | 3/1961 | Schaffer | 250—65 |
| 3,023,851 | 3/1962 | Stiller | 186—1 |
| 3,039,582 | 6/1962 | Simjian | 194—4 |
| 3,061,143 | 10/1962 | Simjian | 221—2 |
| 3,255,339 | 6/1966 | Rausing | 235—61.7 |

DARYL W. COOK, *Acting Primary Examiner.*

MAYNARD R. WILBUR, *Examiner.*

R. E. COUNCIL, *Assistant Examiner.*